United States Patent [19]
Forslund

[11] 4,069,846
[45] Jan. 24, 1978

[54] DEVICE FOR EXTRACTING TREE STUMPS

[75] Inventor: Erik Torsten Forslund, Alfta, Sweden

[73] Assignee: Ostbergs Fabriks AB, Alfta, Sweden

[21] Appl. No.: 729,674

[22] Filed: Oct. 5, 1976

[30] Foreign Application Priority Data

Oct. 8, 1975 Sweden .................... 7511256

[51] Int. Cl.² ........................... A01G 23/08
[52] U.S. Cl. .................... 144/2 N; 37/2 R; 144/34 E; 214/3; 254/132
[58] Field of Search ............ 254/132; 214/3; 37/2 R; 144/2 N, 34 R, 34 E, 34 B, 309 AC

[56] References Cited

U.S. PATENT DOCUMENTS

| | | | |
|---|---|---|---|
| 2,983,482 | 5/1961 | Cary | 214/3 X |
| 3,116,048 | 12/1963 | Irwin et al. | 37/2 R X |
| 3,914,883 | 10/1975 | Bodine | 37/2 R |
| 3,958,613 | 5/1976 | Herz | 37/2 R |

FOREIGN PATENT DOCUMENTS 263,322  4/1970  U.S.S.R. ............... 144/2 N

*Primary Examiner*—Othell M. Simpson
*Assistant Examiner*—W. D. Bray
*Attorney, Agent, or Firm*—Burns, Doane, Swecker & Mathis

[57] ABSTRACT

When a tree stump has been split into several parts by a chopping action, the invention provides a gripping, shaking and cutting unit rigidly connected to the end of a vehicle-carried rotatable crane boom, having an adjustable effective length, for pulling out the stump parts along with their roots one by one from the earth in a direction substantially corresponding to the extension of the roots, and then shaking and cutting the stump parts.

1 Claim, 2 Drawing Figures

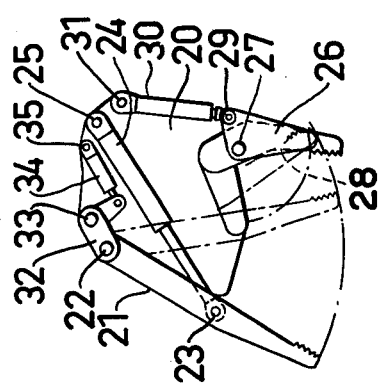
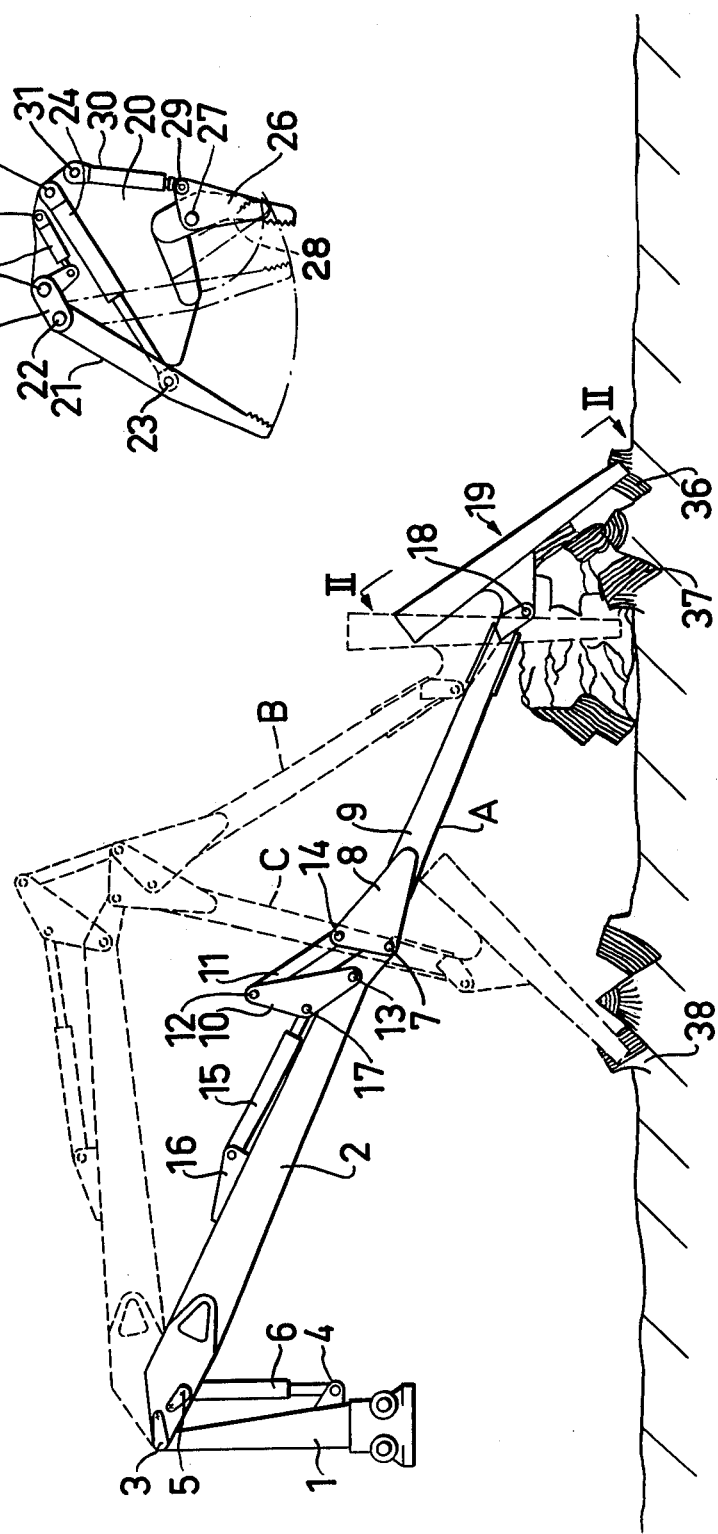

DEVICE FOR EXTRACTING TREE STUMPS

The present invention refers to a device for extracting tree stumps split into several parts.

It is known to use machines for pulling up stumps, shaking off the earth cake and cutting the roots. For the pulling-up action, however, a very considerable lifting force is required, namely of the order of 25 tons.

The invention provides an especially favourable arrangement for the handling of the stump remains in that to the end of a rotatable crane boom having an adjustable effective length a gripping, shaking and cutting unit is rigidly connected for pulling out the stump parts along with their roots one by one in a direction substantially corresponding to the extension of the roots.

Thus, instead of using a single very bulky machine for all operation steps with the accompanying poor utilization in time of the available maximum power, the invention contemplates the use of a first machine for a stump-splitting operation from one stump to the other, and a second, smaller machine for the extraction of the stump parts and the breaking-up thereof, the last-mentioned operation for obtaining a more compact load for transport.

The invention is described in more detail below while referring to the accompanying drawings. There FIG. 1 shows a schematic side view of a vehicle-carried crane boom with a handling unit of the invention, and FIG. 2 shows a front view of said unit, as seen in the direction II—II in FIG. 1.

At the top of a rotatable post 1, mounted on a vehicle not shown, one end of a lift arm 2 is pivoted around a horizontal axis 3 and can be raised and lowered by means of a hydraulic jack 6 acting between an ear 4 on the post and a heaving point 5 on the lift arm. At the outer end of the lift arm 2 one corner of a triangular journal plate 8 for a jib arm 9 is pivoted around a horizontal axis 7. Two links 10 and 11 have respective one ends pivotedly connected to each other, at a point 12, and have respective other ends pivoted at a point 13 adjacent the end of the lift arm 2 and at a point 14 at a second corner of the journal plate 8, respectively. By means of a hydraulic jack 15 positioned between an ear 16 on the lift arm 2 and the centre point 17 of the link 10, the jib arm 9 can be positioned in highly varying angles with respect to the lift arm.

At its outer end the jib arm 9 carries a handling unit, generally designated 19, rigidly fixed at the point 18, for gripping and pulling out a tree stump, as well as cutting the roots, in a manner to be described in the following. As is shown in FIG. 1, the unit 19 has a flat profile, similar to a stork's bill.

In the front view according to FIG. 2 the unit is shown to have a flat frame, as a plate 20, with a grip arm 21 pivoted at a movable point 22 (to be described later) and is at 23 acted upon by a hydraulic jack 24, anchored at the point 25 of the plate, for swinging towards a fixed counter-arm 26. At the point 27 of the fixed arm 26 a knife 28 is pivoted behind said arm (as seen in the figure) and acted upon, at 29, by a hydraulic jack 30 anchored at the point 31 of the plate. Finally, the grip arm 21 is at its above-mentioned pivot point 22 connected to a link 32 having its other end pivoted at a point 33 of the plate and acted upon to oscillate by a hydraulic jack 34 having a longitudinally vibrating piston movement and anchored at the point 35 of the plate.

The arrangement described above operates as follows:

At the lower right corner of FIG. 1 a tree stump is shown which by centre-chopping has been split into four parts, the rightmost one designated 36. The working vehicle (not shown) is directed with its crane boom 2, 9 in the general direction of the root legs of the stump part 36 and with the inclined "stork's bill" 19 in a position to grip the stump part (the full-line position A in FIG. 1 and the full-line position in FIG. 2). The stump part is then gripped (the dash-and-dot-line in FIG. 2) by activating of the hydraulic jack 24 of the plate 20 and is pulled in the general direction of the roots, out from the earth by retraction of the crane boom 2, 9 by means of the hydraulic jacks 6 and 15 (the dashed-line position 2 in FIG. 1). The extracted stump part along with its roots is then shaken and rubbed between the arms 21 and 26 by activating the vibratory hydraulic jack 34 of the plate, so that most of the earth remainings are removed. With the hitherto known vibratory arrangements the effect of vibration is diminishing towards the root ends. With the invention the vibration effect, on the contrary, is increased with increasing distance from the stump part proper (due to the longer lever arm) as a result of the rubbing of the stump part. Then the hydraulic jack 30 of the plate 20 is activated for swinging the knife 28 along the circular path indicated by dash-and-dot-lines in FIG. 2 towards the roots and cutting them off. All these operations are preformed without any change of the grip.

When the thus prepared stump part has been dropped the vehicle is driven forwards and the crane boom 2, 9 is swung backwards to let the bill 19 this time attack the diagonally opposite stump part 37. In order not to complicate FIG. 1, the new gripping operation is shown to act upon another stump 38 (the dashed-line position C). The procedure explained above is repeated whereafter the crane boom is reoriented to attack the two remaining diagonally opposite stump parts.

Various modifications of the embodiment described above are obvious to one skilled in the art. Thus, the crane boom could be of another design — also a telescope boom is contemplatable — and the handling unit with its gripping, shaking and cutting means may be varied in many ways. As a whole, the components shown could be replaced by other ones acting in an equivalent way.

What is claimed is:

1. A device for extracting tree stumps split into several parts, comprising a vehicle-carried crane boom having an adjustable effective length, and a gripping unit rigidly connected to the end of said crane boom for pulling out such stumps with associated roots, one by one, from the earth in a direction substantially corresponding to the extension of the roots, said unit also containing means for shaking the pulled-out stump parts and means for cutting the associated roots, and wherein said unit comprises a flat frame in which are mounted a first hydraulic jack, a swing arm pivoted in said frame to be actuated by said first jack for urging such stump part against a fixed counter-arm for firmly clamping such stump part so that it can be pulled out from the earth, a second hydraulic jack having a longitudinally vibrating piston acting on said swing arm for shaking such pulled-out stump part and rubbing it between said swing arm and said fixed counter-arm, a third hydraulic jack, and a knife pivoted in said frame to be actuated by said third jack for cutting off roots of such pulled-out stump part.

* * * * *